United States Patent
Kotamreddy et al.

(10) Patent No.: US 7,180,520 B2
(45) Date of Patent: Feb. 20, 2007

(54) QUEUE PARTITIONING MECHANISM

(75) Inventors: Sarath Kotamreddy, Chandler, AZ (US); Tuong Trieu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/795,939

(22) Filed: Mar. 8, 2004

(65) Prior Publication Data

US 2005/0195201 A1    Sep. 8, 2005

(51) Int. Cl.
   *G06F 13/14*    (2006.01)
   *G06F 13/18*    (2006.01)
(52) U.S. Cl. .................. 345/519; 345/520; 345/535
(58) Field of Classification Search .............. 345/519, 345/520, 535, 558; 712/1, 232
   See application file for complete search history.

(56) References Cited

U.S. PATENT DOCUMENTS

| | | | | |
|---|---|---|---|---|
| 4,873,703 A | * | 10/1989 | Crandall et al. | 375/371 |
| 6,134,638 A | * | 10/2000 | Olarig et al. | 711/167 |
| 6,184,907 B1 | * | 2/2001 | Min | 345/558 |
| 6,208,703 B1 | * | 3/2001 | Cavanna et al. | 375/372 |
| 6,532,019 B1 | * | 3/2003 | Gulick et al. | 345/519 |

* cited by examiner

*Primary Examiner*—Kee M. Tung
*Assistant Examiner*—Hau Nguyen
(74) *Attorney, Agent, or Firm*—Blakely, Sokoloff, Taylor & Zafman LLP

(57) ABSTRACT

According to one embodiment a chipset is disclosed. The chipset includes a graphics accelerator, a memory controller and a queue mechanism. The queue mechanism includes a first functional unit block (FUB) coupled to the graphics accelerator, and a second FUB coupled to the memory controller.

32 Claims, 3 Drawing Sheets

QUEUE PARTITIONING MECHANISM

FIELD OF THE INVENTION

The present invention relates to computer systems; more particularly, the present invention relates to interfacing computer system chipsets.

BACKGROUND

Integrated Graphics chipsets typically include a graphics accelerator and a memory controller. The graphics accelerator includes a 2D/3D instruction processing unit to control the 2D and 3D graphics engines. These graphics engines interact with a main memory device through the memory controller. The instructions to the memory are carried out through certain command requests, which are processed through a queuing mechanism. The queuing mechanism is used to store some of the information from the graphics engines prior to the information being presented to the memory.

As the size of integrated circuit dies have increased it has become necessary to split up a die into different partitions in order to fulfill the constraints of various back-end tools. Back-end is the process where the die logic is synthesized (e.g., using Synopsys), and goes through layout for auto place and route (APR), after which parasitic extraction and delay calculation are implemented to determine inter-connect delays and the delays through various gates. This extracted information is then used to determine the performance validation (PV) timings using Prime Time. This process is further complicated by the fact that the operating frequencies are also increasing.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A queue partitioning mechanism is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
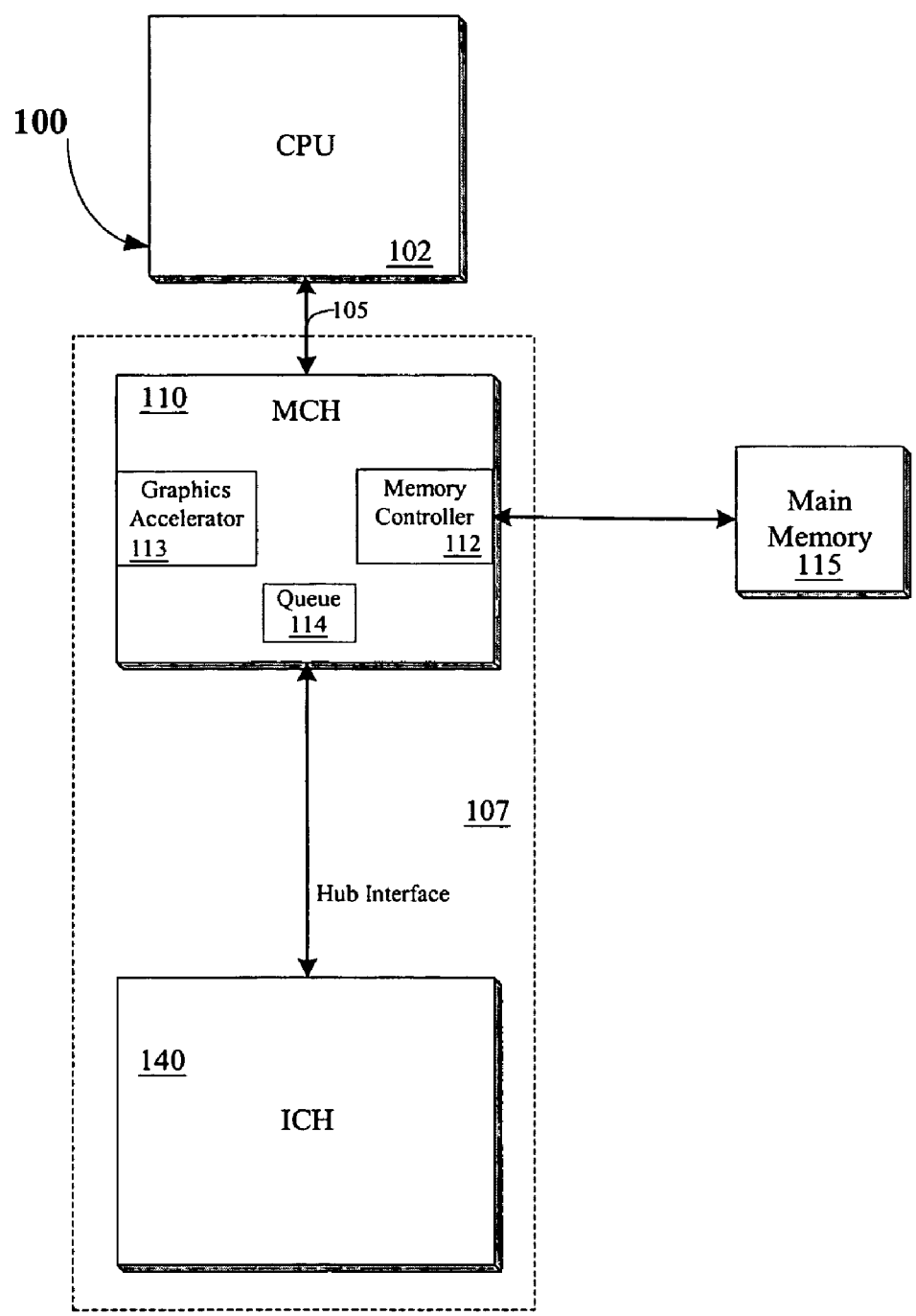
FIG. 1 illustrates one embodiment of a computer system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

In one embodiment, MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

MCH 110 also includes a graphics accelerator 113 to compute graphical transformations. In one embodiment, graphics accelerator 113 includes a 2D/3D instruction processing unit to control 2D and 3D graphics engines. The 2D and 3D graphics engines transmit data to and receives data from main memory 115 via memory controller 112.

In addition, MCH 110 includes a queue 114 to facilitate the interaction between memory 115 and memory controller 112. Queue 114 stores information (e.g., data, command information) from graphics accelerator 114 prior to the information being presented to memory 115. Although described herein with reference to a graphics accelerator/memory interface, one of ordinary skill in the art will appreciate that queue 114 may be implemented for other interfaces.

Figure 2:
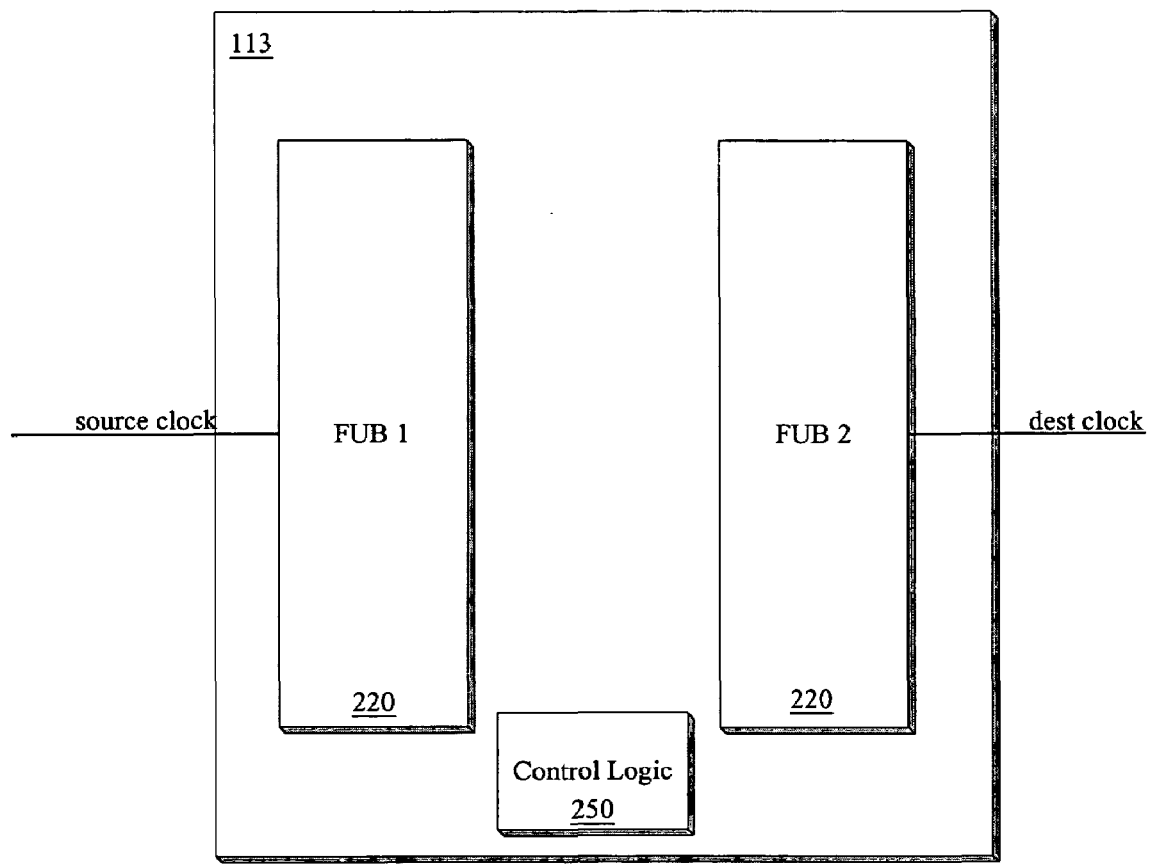
FIG. 2 illustrates one embodiment of a queue partitioning mechanism.

FIG. 2 illustrates one embodiment of queue 114. Queue 114 includes functional unit blocks (FUBs) 220. Queue 114 also includes control logic to facilitate the interface between graphics accelerator 113 and memory controller 112. In one embodiment, the die of MCH 110 is divided into two different partitions in order to compensate for the relatively large size of MCH 110. As a result, the functionality of queue 114 is divided between FUBs 1 and 2 to implement the partitioning of the MCH 114 die. This division makes it easy to remove restrictions on how the die should be partitioned and at the same time allows PV requirements to be met. In addition, dividing the queue the does not add extra gates, nor does it add any additional complexity.

According to one embodiment, FUB 1 is operated based upon a source clock domain, while FUB 2 is operated according to a destination clock domain. Consequently, data is loaded into queue 114 via a source clock, and is unloaded via a destination clock. Note that this scheme works for a queue 114 structure irrespective of the kind of clock crossing (synchronous or asynchronous). Further, there is unidirectional signaling between FUB 1 and FUB 2, such that there will be a strobe (put) and a packet associated with this put that flows from one FUB to the other. Consequently, there is no other combinatorial/boomerang that flows back in response to this.

Figure 3:
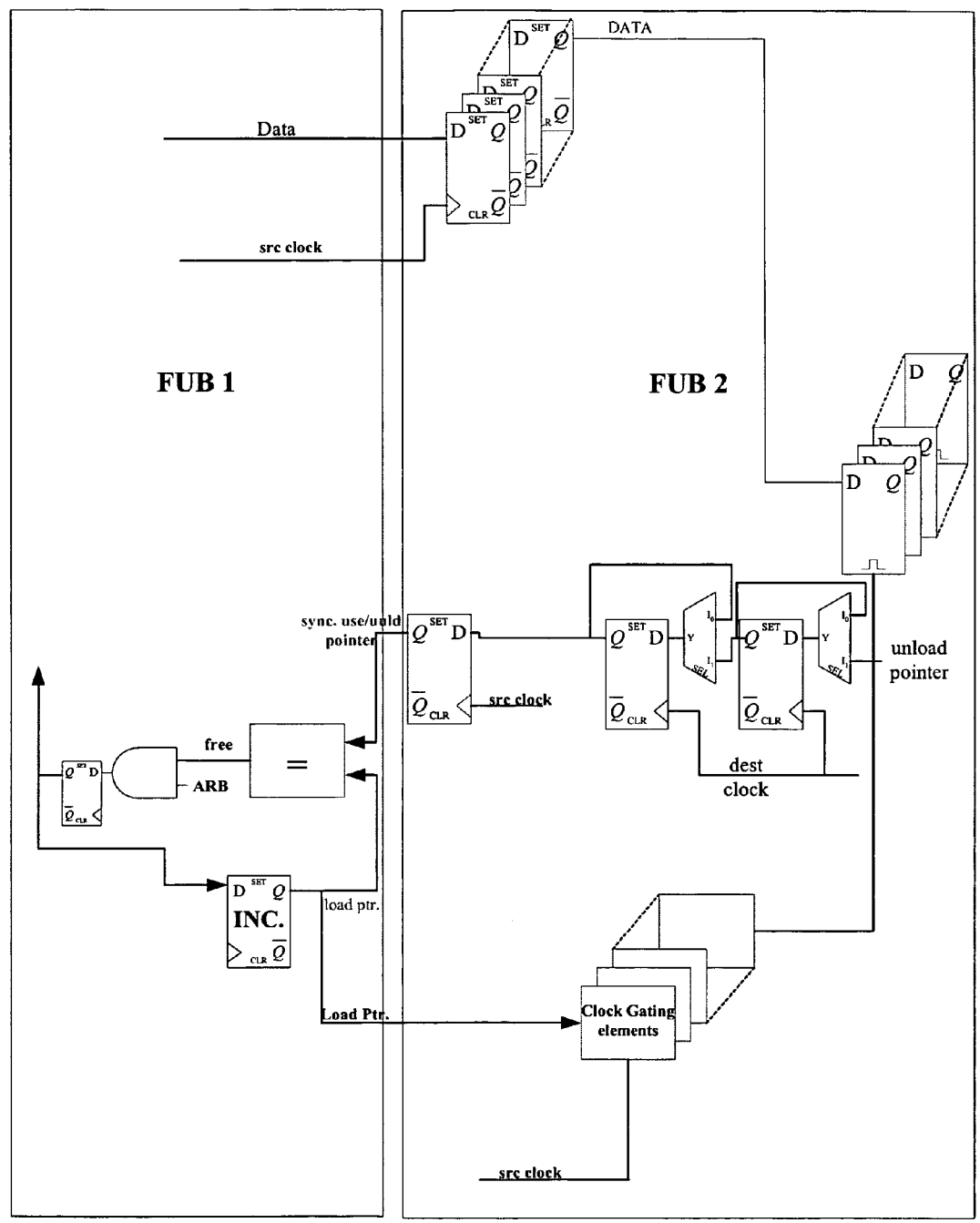
FIG. 3 illustrates another embodiment of a queue partitioning mechanism.

FIG. 3 illustrates a detailed view of FUB 1 and FUB 2. FUB 1 includes logic associated with a load pointer and match logic. FUB 2 includes the storage elements to store data to be transmitted to memory controller 112 and an unload pointer. In addition, FUB 2 includes clock gating elements to gate the load pointer into the destination clock domain.

The load pointer indicates a location in the queue 114 storage elements in which to store information that is to written into the storage elements during a put command.

Each time a put command is executed, the load pointer is incremented by control logic 250 to the next location in the queue to which information will next be written.

The unload pointer indicate a location in the storage elements in which information is to be read from during an unload command. Each time an unload command is executed, the unload pointer is incremented by control logic 250 to the next location in the queue from which information will next be read.

In one embodiment, the load pointer is clock crossed to the destination domain in FUB 1 to save a clock of latency. Similarly, the unload pointer may again be clock crossed to the source domain in the FUB 2. The data to be stored in queue 114 is directly flopped in the source clock domain in FUB 2. Since there is not much logic for this data (e.g., the data is from the output of a flop stage), there is no PV issue by flopping the data directly to FUB 2. Since the storage elements (e.g., latches or flops) are in FUB 2 the load pointer are decoded in the destination domain in order to determine the location in which to place the data.

In one embodiment, the clock crossed versions of the load pointer and the unload pointer are used to determine, at FUB 2, if there is a command present in queue 114. In a further embodiment, the availability of space in queue 114 is determined at the match logic within FUB 1 by using the load pointer and the clock crossed version of the unload pointer.

In one embodiment, the splitting of queue 114 into separate logic blocks enables the destination domain to be moved to a third FUB (FUB 3) at a later time. This move may be simply implemented by removing the destination logic block from FUB 2 and adding it to the hierarchy of FUB 3, and by making sure that the entities of the FUBs reflect these changes. If in this scenario it so happens that the logic block has been moved to another partition which is non-adjacent and if it leads to longer routing delays causing timing issues, the fix is as simple as adding an extra flop stage for the strobe and packet paths.

The above-described mechanism enables the flexibility of moving the logic blocks involving queues around from one partition to another without having to spend an excessive amount of time having to redesign the queue logic. The mechanism also provides a potential of scalability, meaning fixing timing issues by simply adding flop stages on strobe and packet paths without any extra control logic. Further, the queue division works for high frequencies.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A chipset comprising:
   a graphics accelerator;
   a memory controller; and
   a queue mechanism divided to include:
      a first functional unit block (FUB), coupled to the graphics accelerator at a first physical partition on the chipset die, to perform a first set of functions for the queue mechanism; and
      a second FUB, coupled to the memory controller at a second physical partition on the chipset die, to perform a second set of functions for the queue mechanism.

2. The chipset of claim 1 wherein the queue mechanism further comprises control logic to facilitate an interface between the graphics accelerator and the memory controller.

3. The chipset of claim 1 wherein the first FUB is operated based upon a first clock domain and the second FUB is operated according to a second clock domain.

4. The chipset of claim 1 wherein there is unidirectional signaling between the first FUB and the second FUB, such that there will be a strobe and a packet associated with the strobe that flows from the first FUB to the second FUB.

5. The chipset of claim 3 wherein the second FUB comprises storage elements in which to store information that is written into the queue mechanism.

6. The chipset of claim 5 wherein the first FUB comprises:
   logic associated with a load pointer, wherein the load pointer indicates a location in the storage elements to store information; and
   match logic.

7. The chipset of claim 6 wherein the second FUB comprises:
   an unload pointer to indicate a location in the storage elements in which information is to be read from; and
   clock gating elements to gate the load pointer into the second clock domain.

8. The chipset of claim 7 wherein the match logic compares the load and unload pointer to determine whether information is stored in the queue.

9. The chipset of claim 8 wherein the load pointer is clock crossed to the second clock domain in FUB 1 to save a clock of latency.

10. The chipset of claim 9 wherein the unload pointer is clock crossed to the first clock domain in the second FUB.

11. The chipset of claim 10 wherein data to be stored in the storage elements is directly flopped in the first clock domain within the second FUB.

12. The chipset of claim 10 wherein the clock crossed versions of the load pointer and the unload pointer are used to determine at the second FUB if a command is present.

13. The chipset of claim 12 wherein the availability of space in the storage elements is determined at the match logic by using the load pointer and the clock crossed version of the unload pointer.

14. A system comprising:
   a first component;
   a second component; and
   a queue mechanism divided to include:
      a fit functional unit block (FUB), coupled to the first component at a first physical partition on an integrated circuit (IC) die, to perform a first set of functions for the queue mechanism; and
      a second FUB, coupled to the second component at a second physical partition on the IC die, to perform a second set of functions for the queue mechanism.

15. The system of claim 14 wherein the first FUB is operated based upon a first clock domain and the second FUB is operated according to a second clock domain.

16. The system of claim 15 wherein the second FUB comprises storage elements in which to store information that is written into the queue mechanism.

17. The system of claim 16 wherein the first FUB comprises:
   logic associated with a load pointer, wherein the load pointer indicates a location in the storage elements to store information; and
   match logic.

18. The system of claim 17 wherein the second FUB comprises:

an unload pointer to indicate a location in the storage elements in which information is to be read from; and clock gating elements to gate the load pointer into the second clock domain.

19. A queue mechanism comprising:

a first functional unit block (FUB), coupled to a first component at a first physical partition on an integrated circuit (IC) die, to perform a first set of functions for the queue mechanism; and a second FUB, coupled to a second component at a second physical partition on the IC die, to perform a second set of functions for the queue mechanism;

control logic to facilitate an interface between the first component and the second component.

20. The queue mechanism of claim 19 wherein the first FUB is operated based upon a first clock domain and the second FUB is operated according to a second clock domain.

21. The queue mechanism of claim 20 wherein the second FUB comprises storage elements in which to store information that is written into the queue mechanism.

22. The queue mechanism of claim 21 wherein the first FUB comprises:

logic associated wit a load pointer, wherein the load pointer indicates a location in the storage elements to store information; and match logic.

23. The queue mechanism of claim 22 wherein the second FUB comprises:

an unload pointer to indicate a location in the storage elements in which information is to be read from; and clock gating elements to gate the load pointer into the second clock domain.

24. The queue mechanism of claim 23 wherein the match logo compares the load and unload pointer to determine whether information is stored in the queue.

25. The queue mechanism of claim 24 wherein the load pointer is clock crossed to the second clock domain in FUB 1 to save a clock of latency.

26. The queue mechanism of claim 25 wherein the unload pointer is clock crossed to the first clock domain in the second FUB.

27. The queue mechanism of claim 26 wherein data to be stored in the storage elements is directly flopped in the first clock domain within the second FUB.

28. The queue mechanism of claim 26 wherein the clock crossed versions of the load pointer and the unload pointer are used to determine at the second FUB if a command is present.

29. The queue mechanism of claim 28 wherein the availability of spate in the storage elements is determine at the match logo by using the load pointer and the clock crossed version of the unload pointer.

30. A computer system comprising:

a memory control hub (MCH) divided into a first physical partition and a second physical partition, having:

a graphics accelerator;

a memory controller;

a queue mechanism divided to include:

a first functional unit block (FUB), coupled to the graphics accelerator at the first physical partition on the MCH, to perform a first set of functions for the queue mechanism; and a second FUB, coupled to the memory controller at the second physical partition on the MCH, to perform a second set of functions for the queue mechanism.

31. The computer system of claim 30 wherein to queue mechanism further comprises control logic to facilitate an interface between the graphics accelerator and the, memory controller.

32. The computer system of claim 30 wherein the first FUB is operated based upon a first clock domain and the second FUB is operated according to a second clock domain.

* * * * *

UNITED STATES PATENT AND TRADEMARK OFFICE
CERTIFICATE OF CORRECTION

| | |
|---|---|
| PATENT NO. | : 7,180,520 B2 |
| APPLICATION NO. | : 10/795939 |
| DATED | : February 20, 2007 |
| INVENTOR(S) | : Kotamreddy et al. |

Page 1 of 1

It is certified that error appears in the above-identified patent and that said Letters Patent is hereby corrected as shown below:

In column 5, at line 34, delete "logo" and insert --logic--.

In column 6, at line 12, delete "spate" and insert --space--.

In column 6, at line 13, delete "logo" and insert --logic--.

In column 6, at line 32, delete ",".

Signed and Sealed this

Eighth Day of April, 2008

JON W. DUDAS
*Director of the United States Patent and Trademark Office*